United States Patent

Gilchrist

[15] 3,702,433
[45] Nov. 7, 1972

[54] ALTERNATOR REGULATOR CIRCUIT
[72] Inventor: Forbes D. Gilchrist, Chicago, Ill.
[73] Assignee: Motorola, Inc., Franklin Park, Ill.
[22] Filed: Feb. 25, 1971
[21] Appl. No.: 118,911

[52] U.S. Cl. .................................. 322/28, 320/48
[51] Int. Cl. ............................................ H02p 9/30
[58] Field of Search ............. 320/64, 39, 61, 69, 20; 322/28, 60, 73; 317/49

[56] References Cited

UNITED STATES PATENTS

| | | | |
|---|---|---|---|
| 3,343,059 | 9/1967 | Kirk et al. | 320/61 X |
| 3,487,284 | 12/1969 | Cady | 320/20 |
| 3,585,490 | 6/1971 | Zelina | 322/28 |
| 3,612,982 | 10/1971 | Jones et al. | 322/28 |
| 3,121,837 | 2/1964 | Holm et al. | 322/28 |
| 3,568,041 | 3/1971 | Arakane | 322/28 |
| 3,593,102 | 7/1971 | Kawashima | 322/28 X |
| 3,349,318 | 10/1967 | Poppinger | 322/28 |
| 3,350,626 | 10/1967 | Mosier | 322/73 |
| 3,469,175 | 9/1969 | Kirk | 322/28 |
| 3,470,455 | 9/1969 | Korda | 322/73 X |
| 3,588,663 | 6/1971 | Hirata | 322/28 X |

OTHER PUBLICATIONS

" Silicon controlled Rectifier Manual," page V, Third Edition, General Electric.

Primary Examiner—Richard B. Wilkinson
Assistant Examiner—U. Weldon
Attorney—Mueller & Aichele

[57] ABSTRACT

An alternator regulator is arranged to control field excitation current when receiving such excitation current from one of the three phase stator windings which form the output of the alternator. Starting current to the excitation field winding is supplied through a resistor, and after initiation of operation of the alternator, continued excitation of the field winding is achieved by the output of the alternator itself. A silicon controlled rectifier is connected in series with the excitation field winding to control current therethrough and the gate current to the silicon controlled rectifier is supplied by a direct connection to the alternator output or a battery supply connected thereto.

5 Claims, 2 Drawing Figures

INVENTOR.
FORBES GILCHRIST

BY Mueller & Aichele
ATTORNEYS.

ALTERNATOR REGULATOR CIRCUIT

BACKGROUND OF THE INVENTION

This invention relates generally to a regulator circuit and more particularly to a semiconductor voltage regulator circuit which can be used to control the output voltage from an alternator or generator.

In motor vehicle electrical systems, it is common practice to use an alternator or generator for supplying charging current to a battery as well as supplying current to certain loads on the automobile, when the engine is running. The regulator units used to control the output voltage of the alternator must be reliable and efficient in operation and relatively inexpensive to manufacture and maintain. In practice, the automobile electrical system must fulfill the needs of supplying power to start and operate the automobile to maintain the battery power at an optimum value and to be reliable and maintenance free of a wide range of ambient temperatures and climate conditions. The storage battery of an automobile supplies large amounts of current during a starting or cranking condition of the engine while the alternator supplies moderate amounts of current for recharging the battery and for operating certain loads of the automobile. However, it is the voltage regulator of the electrical system which must be the most flexible of the units involved as it is the voltage regulator which controls and compensates for the different variables encountered in the system.

For the most part, voltage regulators used in automotive electrical systems must meet several requirements. For example, the voltage regulator itself must be a reliable device for controlling charging current to the battery over a wide range of ambient temperature conditions, and it must have a long operating life. The regulator must be substantially maintenance and adjustment free, and must have the ability to withstand high voltage transients which may occur in the system during operation of the automobile. These transients may occur because of the ignition system and they may have a voltage value in the order of 400 volts or more.

The conventional mechanical regulators heretofore used in automobile electrical systems are relatively complex devices. These mechanical regulators rely on the rapid opening and closing of at least one set of electric contacts. These electric contacts often pit and wear over a period of time to a condition which would adversely affect the operating efficiency of the voltage regulator. This type of regulator requires periodic readjustment to maintain the correct rate of charge to the battery and electrical system. While existing solid state regulators have eliminated the problem of contact wear and periodic readjustment, they are still subject to damage as a result of either transient voltages or high voltage open circuit charging paths which may occur when the alternator is inadvertently disconnected from the storage battery.

SUMMARY OF THE INVENTION

Accordingly, it is an object of this invention to provide an improved voltage regulator circuit for use with an alternator and wherein the regulator circuit is efficient and reliable in operation and inexpensive to manufacture and maintain.

Another object of this invention is to provide an improved voltage regulator circuit for use with an alternator so that the regulator will maintain the open circuit voltage of the alternator at substantially the desired output voltage value when the storage battery is not connected to the system.

Briefly, the voltage regulator of this invention uses a silicon controlled rectifier connected in series with the excitation field winding of the alternator to control the excitation current passing through the field winding. The silicon controlled rectifier has the gate electrode thereof directly connected to the battery or alternator output, or other direct current source, so that the silicon controlled rectifier is operated as a diode during the initial start-up condition of the alternator to provide maximum output from the alternator and regulator at the beginning of operation. The main excitation current through the field winding is obtained from the output voltage of one stator winding of the alternator so that the alternator operation is self sustained once started.

DESCRIPTION OF THE ILLUSTRATED EMBODIMENTS

Figure 1:
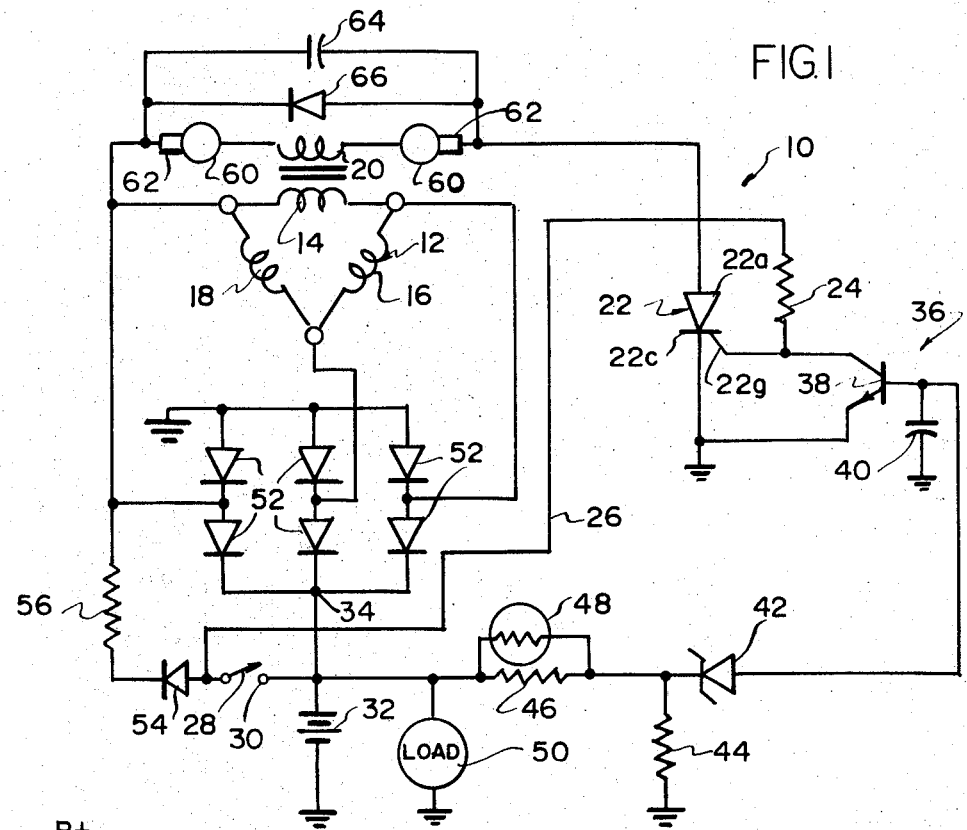
FIG. 1 is a schematic diagram of the voltage regulator circuit constructed in accordance with the principles of this invention.

Referring now to FIG. 1, the voltage regulator circuit of this invention is designated generally by reference numeral 10 and includes an alternator 12 having stationary output windings 14, 16 and 18 which develop an output voltage in response to a changing magnetic field. This magnetic field is produced by current flow in an excitation field winding 20. The excitation current through the field winding 20 is controlled in response to the conduction or nonconduction of a silicon controlled rectifier 22 which has the anode 22a thereof connected to the field winding 20 and the cathode 22c connected to ground potential. A gate electrode 22g of the silicon controlled rectifier 20 is direct current coupled through a resistor 24 and line 26 to a DC voltage source so that the silicon controlled rectifier is gated to an on condition at the initiation of operation of the alternator and regulator system and therefor it acts as a diode. The direct current source to the gate 22g passes through an ignition on/off switch 28, which, in turn, is connected to a terminal 30 common to a battery supply 32 and an output terminal 34 of the alternator system.

The DC voltage source applied to the gate 22g of the silicon controlled rectifier 22 can be any suitable voltage source to render the silicon controlled rectifier conductive during initial operation of the system, the silicon controlled rectifier then acts as a diode in the circuit during this period of time. To turn off the silicon controlled rectifier 22 a control circuit means 36 is connected to the gate 22g and cathode 22c to prevent gate current from flowing between the gate cathode junction. The control circuit means 36 is here illustrated as including a transistor 38 having the collector emitter junction thereof shunting the gate cathode junction of the silicon controlled rectifier. The base electrode of the transistor 38 is connected to a capacitor 40 and to the direct current voltage source at terminal 30 through a reference potential device, here illustrated as a zener diode 42. As the output of the alternator 12 as sensed at terminal 34, increases so that sufficient charge is obtained in the battery 32 so also does the voltage value increase at circuit point 30. The increase in voltage value will ultimately cause current to flow through the zener diode 42 and charge the capacitor 40 which will, in turn, render the transistor 38 conductive. Conduction of transistor 38 will shunt current to the gate 22g and disable the silicon controlled rectifier 22. To limit the current flow through the zener diode 42 and to set the desired voltage level of the sensing circuit, a resistor 44 is connected between the cathode of the zener diode 42 and ground potential.

A temperature compensating circuit is connected between the direct current voltage source terminal 30 and the zener diode 42 and resistor 44 and may include a fixed resistor 46 and a temperature compensating resistor 48 connected in parallel therewith. The resistors 46 and 48 in series with the resistor 44 serve as a voltage divider to set the desired voltage level at the zener diode 42. As ambient temperature conditions change, for example, due to seasonal change or to climate differences in various regions of the country, the temperature responsive resistor 48 will change in value to automatically produce a compensating effect on the zener diode 42 and shift the voltage value at which the voltage regulator 10 will regulate.

A load 50 is illustrated diagrammatically and represents the various electrical appliances and apparatus energized by the electrical system in which the voltage regulator 10 is utilized. For example, load 50 may include automobile head lamps, tail lamps, fan motors, as well as other electrical equipment.

The on/off ignition switch 28 has one end thereof connected to a diode 54 which, in turn, is connected to a resistor 56 for applying a small amount of initial starting current to the excitation field winding 20. During initial start up of the system, when ignition switch 28 is closed, the small excitation current which flows through the diode 54 and resistor 56 is sufficient to produce a magnetic field which will generate an output voltage at the windings 14, 16 and 18. Once the alternator is running and the output diodes 52 apply a positive voltage to terminal 34, the output of the alternator system is substantially self-sustaining in that no further excitation from the battery or other direct current voltage source is required.

After the automobile engine has started running the magnetic field in the field winding 20 is increased substantially by current flow which now comes from the connection to the output winding 14 which then acts as a voltage source. This closed loop type of operation, once started, will continue indefinitely without further external excitation from a battery. The current passing through the excitation field winding 20 also passes through slip rings 60 and brushes 62 diagrammatically illustrated as connected in series therewith to switch the silicon controlled rectifier 22 on and off on alternate zero crossings of the sinusoidal current provided to the field winding 20.

To smooth out or substantially filter the pulses of current passing through the excitation field winding 20, a capacitor 64 is connected in parallel therewith. Also a diode 66 is connected in parallel with the field winding 20 and serves to prevent high voltage spikes from developing when conduction of the silicon controlled rectifier 22 is abruptly stopped by reversal of the anode-cathode current at the end of each positive half-cycle of the signal provided to the field winding 20.

Figure 2:
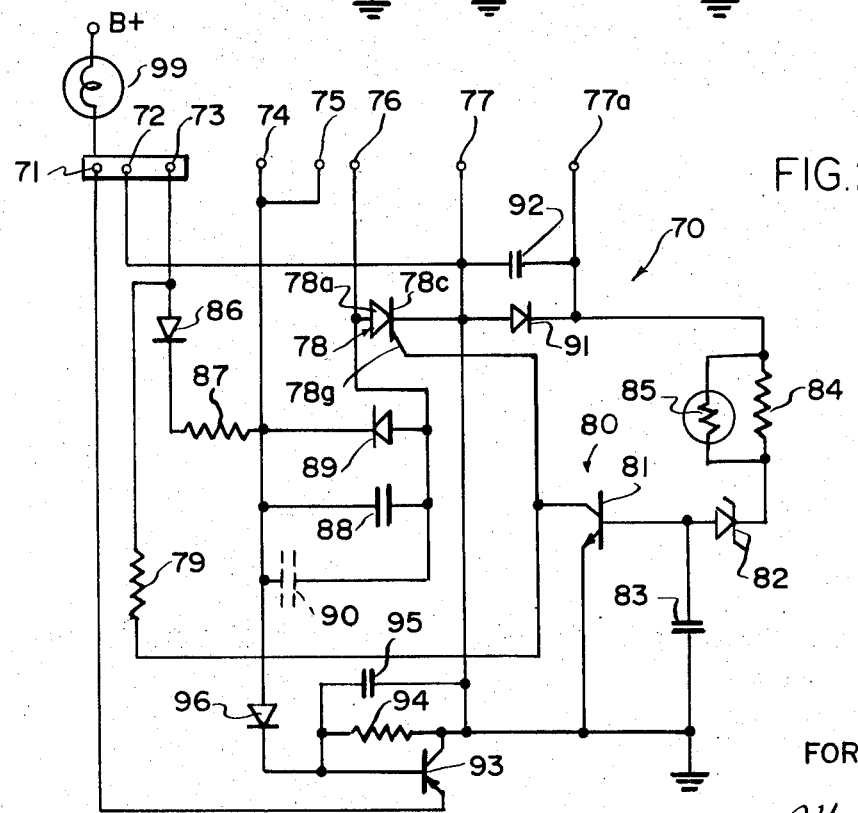
FIG. 2 illustrates the voltage regulator of FIG. 1 with several modifications made thereto and shown as a unit to be adapted to an electrical system of an automobile.

Referring now to FIG. 2 there is seen a voltage regulator circuit, without the alternator components shown, and which has incorporated several modifications. The voltage regulator as shown in FIG. 2 may be an add on unit to present electrical systems. Here the voltage regulator is designated generally by reference numeral 70 and include a plurality of connecting terminals 71, 72, 73, 74, 75, 76, 77 and 78 to which the various electrical components of an automobile are connected for operation. The field winding of an alternator is connected across terminals 75 and 76 while the common stator winding, corresponding to winding 14 of FIG. 1, is connected to terminal 74. Ground potential is applied to terminals 72 and 77. To control the excitation current through the field winding across terminal 75 and 76 a silicon controlled rectifier 78 has the anode electrode 78a connected to terminal 76 and the cathode electrode 78c connected to terminal 77 which is ground potential. The gate electrode 78g of the silicon controlled rectifier 78 is connected through a resistor 79 to a DC voltage source at terminal 73 which corresponds to the ignition switch connection of FIG. 1. This causes the silicon controlled rectifier 78 to be rendered conductive and act as a diode upon initial operation of the circuit.

Control circuit means 80 is provided to control nonconduction of the silicon controlled rectifier 78 when excessive output voltage is sensed at the output of the alternator and battery terminal 77a. The control circuit means 80 is similar to the control circuit means 36 and includes a transistor 81 which has the collector emitter electrodes thereof shunting the gate cathode circuit of the silicon controlled rectifier 78 to hold it nonconductive in response to a high conduction state of the transistor 81. To minimize inadvertent and erratic variations of conduction of the transistor 81, a capacitor 83 is connected between the base and emitter electrodes thereof and receives charge through a zener diode 82, which, in turn, is connected in series with a temperature compensating resistor 85 which is shunting a fixed resistor 84.

Initial excitation of the field winding which is to be connected across terminals 75 and 76 is obtained by a small current flow through a diode 86 and a resistor 87 which receives current from the ignition switch (not shown) at terminal 73. Upon closing of the ignition switch a small excitation current flows through the field winding for initial operation. However, once the engine is started the alternator output serves as the voltage source connected to the voltage regulator circuit, i.e., the alternator excitation current will be obtained by one of the alternator stator windings as disclosed with regard to FIG. 1.

A capacitor 88 is connected across terminal 75 and 76 and acts as a filter capacitor for the pulsating current passing through the excitation field winding. To prevent transient spikes from affecting the electronic circuitry, a diode 89 is shunted across capacitor 88. However, if it is desirous to increase the output power capabilities of the alternator which is connected to the regulator 70, a second capacitor 90 is connected across capacitor 88, and the capacitor is optional.

To prevent transients, which may be caused by the ignition system of an automobile, from affecting the regulator circuit 70, a diode 91 and capacitor 92 are connected between the ground and plus terminals 77 and 77a, respectively.

An indicator lamp circuit is provided and energizes a lamp 99 connected to terminal 71. The lamp 99 is located within the interior of an automobile to indicate to the driver the charge or discharge condition of the alternator output.

Terminal 71 has connected thereto a transistor 93 which has its collector electrodes connected to ground potential. The transistor 93 is biased on by a current path between the emitter and base electrodes through a resistor 94 to ground potential. Therefore, when the ignition switch is turned on, the lamp connected to terminal 71 will be energized thus indicating no output from the alternator. However, once the engine is started and an output voltage is sensed at terminal 74, a diode 96 which is connected thereto will apply a positive voltage across a capacitor 95 which will become more positive than the positive voltage applied to the emitter electrode of transistor 93. This action will reverse bias the base emitter junction and render transistor 93 nonconductive to deenergize the indicating lamp connected to terminal 71.

What has been described is a simple and efficient voltage regulator circuit for use with alternators wherein a silicon controlled rectifier is used to control excitation current through a field winding and the silicon controlled rectifier is initially operated as a diode, and wherein the current passing through the field winding is obtained by transformer coupling from the output of one of the stator windings.

I claim:

1. A voltage regulator for controlling the output of an alternator comprising in combination:
   at least one stator winding associated with the alternator and in which is generated an output voltage;
   an excitation field winding having first and second ends for creating a magnetic field which will induce the output voltage into said stator winding;
   means coupling said at least one stator winding with the second end of said field winding for providing alternating current signals to said field winding;
   a direct current voltage source terminal;
   a controlled rectifier with a gate, anode and cathode, the cathode thereof being coupled with a point of reference potential and the anode thereof connected in series circuit with the first end of said excitation field winding;
   switch means for coupling said controlled rectifier and said excitation field winding in series circuit with said direct current voltage source terminal;
   means coupling the gate of said controlled rectifier to the output of the alternator and to said direct current voltage source terminal to initially render said controlled rectifier conductive;
   electronic control means connected across the cathode-gate electrodes of said controlled rectifier, said electronic control means having a first portion for shunting said gate electrode to said point of reference potential with said control means being conductive, and a second portion;
   rectifier means having at least one alternating current input terminal coupled with said at least one stator winding and having at least one direct current output terminal coupled with said direct current voltage source terminal, and
   sensing means connected in circuit with said second portion of said electronic control means and connected with said direct current output terminal of the alternator for sensing at least a portion of the output voltage therefrom and rendering said electronic control means conductive to shunt the gate electrode of said controlled rectifier in response to an output voltage of the alternator in excess of a predetermined amount.

2. The combination according to claim 1 wherein the point of reference potential is ground potential and said controlled rectifier is a silicon controlled rectifier and further including diode means and a capacitor connected in parallel with one another across said field winding, the anode of said diode means connected to said first end of said field winding and the cathode of said diode means connected to said second end of said field winding.

3. The combination according to claim 2 further including a second diode means and a resistor connected in series between said switch means and said second end of said field winding for supplying an initiating current through said excitation field winding and said silicon controlled rectifier during initial startup of the alternator.

4. The voltage regulator circuit of claim 1 wherein said controlled rectifier is a silicon controlled rectifier and wherein said electronic control means is a transistor with its emitter-collector electrodes forming said first portion and connected across the cathode-gate electrodes of said silicon controlled rectifier, and the base electrode of said transistor forms said second portion connected to said sensing means.

5. The voltage regulator circuit of claim 4 wherein said sensing means includes a capacitor connected between the point of reference potential and the base electrode of said transistor, and a zener diode connected between the direct current voltage source terminal and such base electrode to control the voltage value of the voltage regulator.

* * * * *